(12) United States Patent
Nasu et al.

(10) Patent No.: US 6,621,785 B2
(45) Date of Patent: Sep. 16, 2003

(54) CARTRIDGE LOADING MECHANISM FOR OPTICAL STORAGE DEVICE

(75) Inventors: Hideo Nasu, Kawasaki (JP); Kazuhiko Kageyama, Kawasaki (JP); Hideki Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 09/795,556

(22) Filed: Feb. 28, 2001

(65) Prior Publication Data

US 2001/0048651 A1 Dec. 6, 2001

(30) Foreign Application Priority Data

May 31, 2000 (JP) .......................... 2000-163744

(51) Int. Cl.⁷ .......................... G11B 33/02; G11B 17/04
(52) U.S. Cl. .................. 369/77.2; 360/99.02; 360/99.06
(58) Field of Search .............................. 369/77.2, 77.1; 360/99.02, 99.03, 99.06, 99.07

(56) References Cited

U.S. PATENT DOCUMENTS 4,987,506 A * 1/1991 Uehara ....................... 360/256
6,233,115 B1 * 5/2001 Kawakami ............... 360/99.06

FOREIGN PATENT DOCUMENTS

| JP | 63037854 A | * | 2/1988 | ........... G11B/17/04 |
|----|------------|---|--------|----------------------|
| JP | 6290524 | | 10/1994 | |
| JP | 8-096465 | | 4/1996 | |

* cited by examiner

Primary Examiner—William Klimowicz
(74) Attorney, Agent, or Firm—Greer, Burns & Crain, LTD

(57) ABSTRACT

Disclosed herein is a storage device including a turntable assembly movable between a raised position and a lowered position, a load plate adapted to move from a first position to a second position in concert with insertion of a carrier into the storage device, and a spring for biasing the load plate to the second position. When the load plate is moved to the second position, the turntable assembly is moved to the raised position. The storage device further includes a base and a timing arm mounted on the base so as to be pivotally movable between a third position for maintaining the load plate in the first position and a fourth position for disengaging the load plate in concert with the insertion of the carrier to allow movement of the load plate to the second position. The distance L1 between a pivotal center of the timing arm and a point of engagement of the timing arm and the load plate and the distance L2 between the pivotal center and a point of engagement of the timing arm and the carrier are related to satisfy $L1 \geq L2$.

14 Claims, 22 Drawing Sheets

CARTRIDGE LOADING MECHANISM FOR OPTICAL STORAGE DEVICE

BACKGROUND OF THE INVENTION

1. Field of the Invention

The present invention relates generally to an optical storage device, and more particularly to a cartridge loading mechanism for an optical storage device.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head).

A recent optical pickup for an optical disk drive intended to realize size reduction is composed of a fixed optical assembly including a laser diode, a polarization beam splitter for reflecting and transmitting a laser beam, and a photodetector for receiving reflected light from an optical disk, and a movable optical assembly including a carriage and an objective lens mounted on the carriage. The carriage is movable in the radial direction of the optical disk along a pair of rails by means of a voice coil motor.

A write-power laser beam emitted from the laser diode of the fixed optical assembly is first collimated by a collimator lens, next transmitted by the polarization beam splitter, next reflected by a beam raising mirror of the movable optical assembly, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

In a conventional cartridge loading mechanism, a turntable assembly having a spindle motor is mounted on a load plate. The turntable assembly is movable between a raised position where the optical disk in the cartridge inserted into the disk drive is chucked to a turntable and a lowered position where the optical disk is unchucked from the turntable. In such a spindle loading type, the load plate is movable between a first position and a second position according to insertion and ejection of the cartridge with respect to the disk drive. The load plate is normally biased toward the second position by a spring.

When the load plate is moved to the second position, the turntable assembly is moved to the raised position, whereas when the load plate is moved to the first position, the turntable assembly is moved to the lowered position. As another loading type, a cartridge loading type is also known in which a cartridge holder is vertically moved to chuck the optical disk to a turntable fixed in vertical position.

The conventional cartridge loading mechanism has an eject arm for ejecting the cartridge from the disk drive. The eject arm is integrally formed with a timing portion engaging with the load plate in the condition where the cartridge is not inserted in the disk drive. In the condition where the cartridge is not inserted in the disk drive, the timing portion of the eject arm is engaged with the load plate to maintain the load plate in the first position, thereby maintaining the turntable assembly in the lowered position.

When the cartridge is inserted into the disk drive, the eject arm is pushed by the cartridge to pivotally move. When the eject arm is pivotally moved to a given position, the timing portion of the eject arm is disengaged from the load plate, so that the load plate is moved to the second position by the biasing force of the spring. Accordingly, the turntable assembly is lifted, so that a reference pin formed on the turntable assembly comes into engagement with a reference hole of the cartridge, and the turntable chucks a hub of the optical disk. As a result, the optical disk is connected to the turntable and rotated at a high speed by the spindle motor to perform reading/writing of data from/to the optical disk by operating the optical pickup.

In the conventional cartridge loading mechanism as mentioned above, the timing portion for determining the timing of chucking of the optical disk to the turntable is integrated with the eject arm, and the distance between a pivotal center of the eject arm and a point of contact of the eject arm and the cartridge inserted into the disk drive is set considerably longer than the distance between the pivotal center and a point of engagement of the timing portion and the load plate. Accordingly, although the eject arm is designed so that the timing portion is disengaged from the load plate when the cartridge pushes the eject arm to pivotally move it and is inserted to a given position, this given position is not constant and considerably varies.

Thus, there are variations in position of the cartridge inserted into the disk drive at the time of disengaging the timing portion from the load plate. As a result, there is a case that the reference pin of the turntable assembly cannot be engaged with the reference hole of the cartridge, causing defective chucking of the optical disk in loading the cartridge. In the case of the cartridge loading type such that the cartridge holder and the cartridge held therein in the disk drive are vertically movable, the reference pin is provided on a fixed member such as a chassis or a base opposed to the cartridge holder. When the cartridge holder is lowered, the reference hole of the cartridge comes into engagement with the reference pin on the fixed member.

SUMMARY OF THE INVENTION

It is therefore an object of the present invention to provide a cartridge loading mechanism which can prevent defective chucking of an optical disk in loading a cartridge having the optical disk.

It is another object of the present invention to provide a reliable optical storage device which can prevent defective chucking of an optical disk.

In accordance with an aspect of the present invention, there is provided a storage device comprising a turntable adapted to engage a storage medium for rotatably supporting the storage medium; a load plate adapted to move from a first position to a second position in concert with insertion of a carrier carrying the storage medium into the storage device for chucking the storage medium to the turntable; and a timing arm having a first arm for engaging the load plate to maintain the load plate in the first position, a second arm adapted to engage the carrier inserted into the storage device, and an operational center for cooperating the first arm and the second arm; the distance between the operational center and a position of engagement of the first arm and the load plate being set greater than or equal to the distance between the operational center and a position of engagement of the second arm and the carrier.

The carrier may be a cartridge in which the storage medium is accommodated or a tray for placing the storage medium thereon. The storage medium is selected from any one of a read-only type optical disk, a phase-change type optical disk, a magneto-optical disk, and a magnetic disk. Preferably, the first arm is pivotally movable between a third position for maintaining the load plate in the first position and a fourth position for disengaging the load plate in concert with the insertion of the carrier to allow movement of the load plate to the second position.

Preferably, the storage device further comprises a holder for holding the carrier inserted in the storage device, an eject arm adapted to engage the carrier, and a biasing member for biasing the eject arm in a direction of ejecting the carrier from the storage device. When the storage medium is unchucked from the turntable, the eject arm ejects the carrier from the storage device. The storage device further comprises a base, and a pinion unit rotatably mounted on the base. The eject arm has a rack meshing with the pinion unit.

Preferably, the turntable is mounted on a turntable assembly movable between a raised position where the storage medium is chucked to the turntable and a lowered position where the storage medium is unchucked from the turntable. The carrier has a reference hole, and the turntable assembly has a reference pin adapted to be inserted into the reference hole of the carrier in the raised position.

According to the present invention, the position of the carrier inserted into the disk drive at the time of disengaging the timing arm from the load plate can be made always constant, so that the reference pin of the turntable assembly can be reliably engaged into the reference hole of the carrier, and the turntable can reliably chuck the hub of an optical disk as the storage medium.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
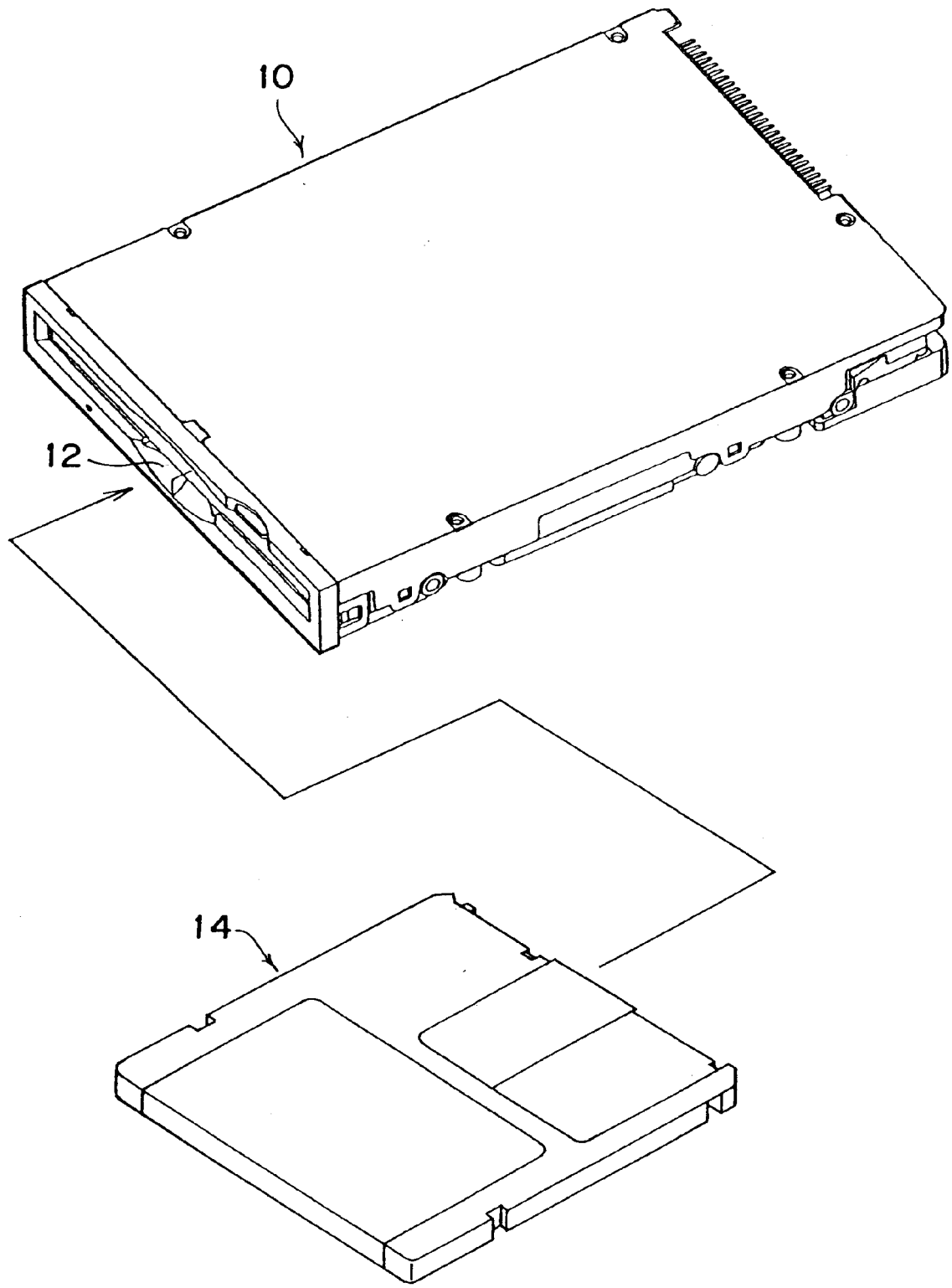
FIG. 1 is an upper perspective view of a magneto-optical disk drive including a cartridge loading mechanism according to the present invention.
Figure 2:
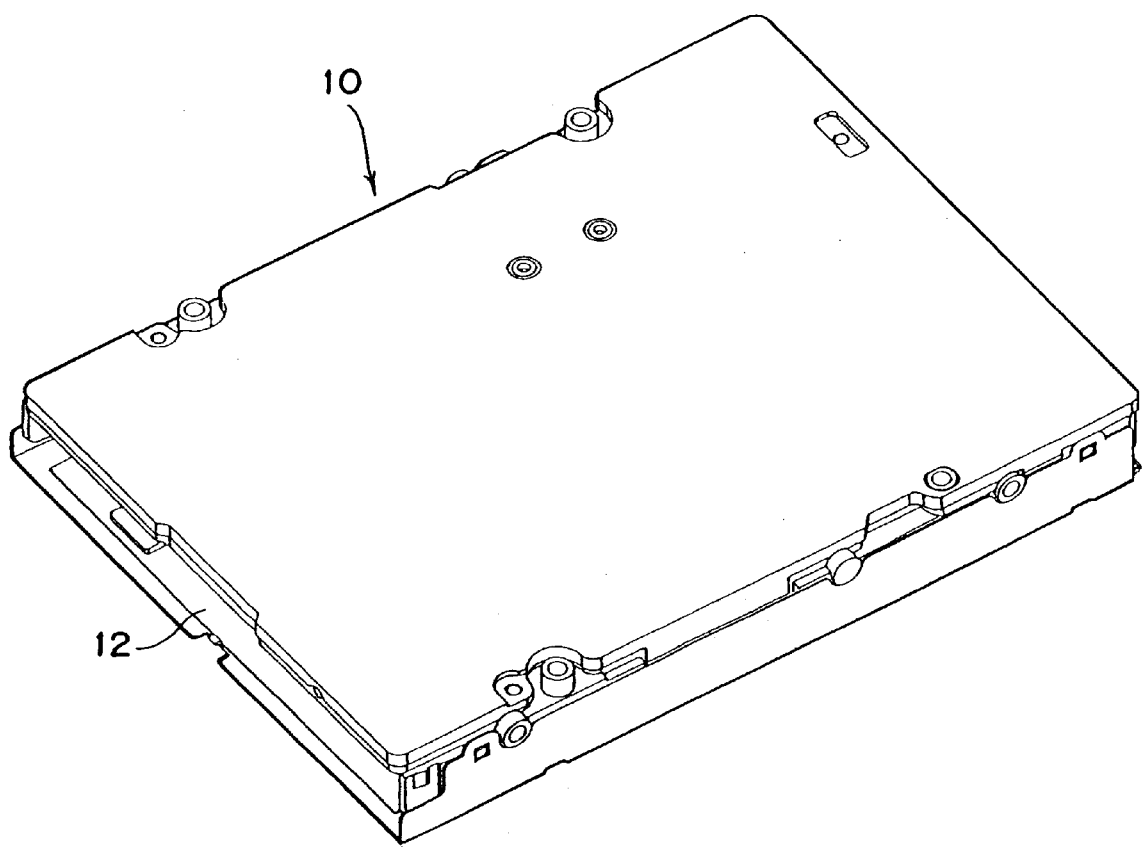
FIG. 2 is a lower perspective view of the magneto-optical disk drive.

Referring to FIG. 1, there is shown a perspective view of a magneto-optical disk drive 10 to which the present invention is applied, as viewed from the upper side. FIG. 2 is a perspective view of the magneto-optical disk drive 10 as viewed from the lower side. The magneto-optical disk drive 10 accepts a magneto-optical disk cartridge 14 having a cartridge case and a magneto-optical disk (both will be hereinafter described) accommodated in the cartridge case, and performs reading/writing of data from/to the magneto-optical disk in the magneto-optical disk cartridge 14.

As will be hereinafter described in detail, the magneto-optical disk drive 10 includes a load/eject mechanism for the magneto-optical disk cartridge 14, a spindle motor having a turntable for rotating the magneto-optical disk, a bias magnetic field generating mechanism, a fixed optical assembly, and a movable optical assembly. The magneto-optical disk drive 10 further has an insert opening 12 for accepting the magneto-optical disk cartridge 14.

Figure 3:
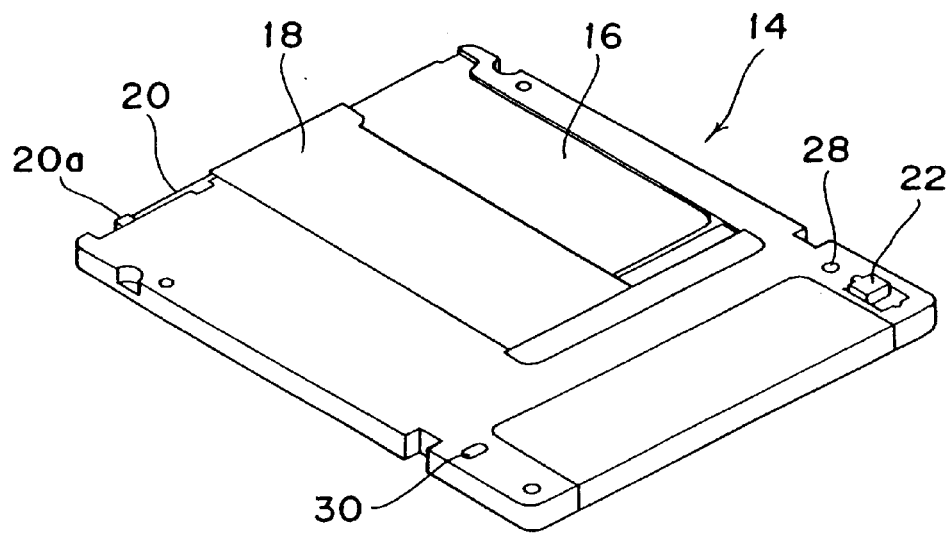
FIG. 3A is a perspective view of a magneto-optical disk cartridge in a shutter closed condition.
FIG. 3B is a perspective view of the magneto-optical disk cartridge in a shutter open condition.
Figure 3:
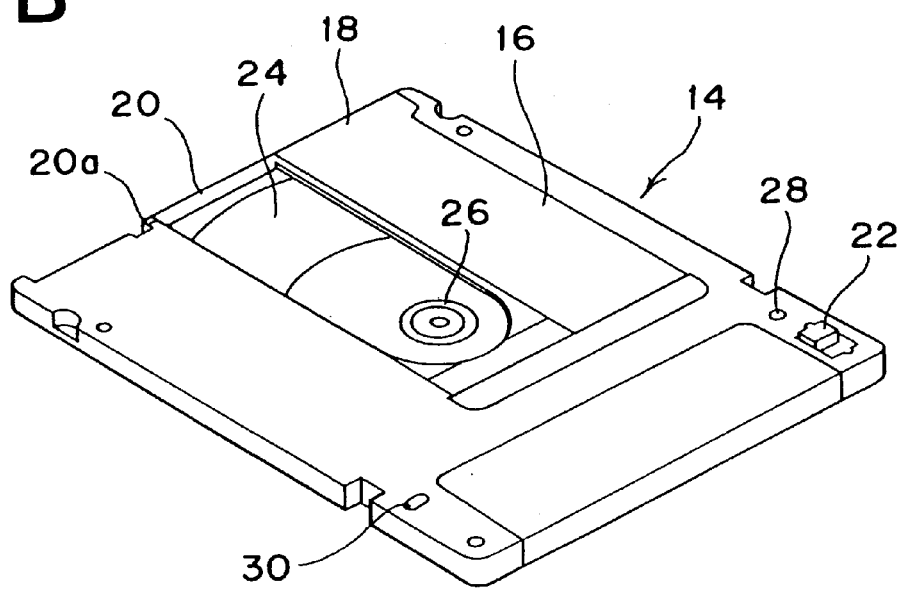

FIGS. 3A and 3B are perspective views of the magneto-optical disk cartridge 14 in its different conditions, as viewed from the lower side. It should be noted that FIG. 1 shows the upper side of the magneto-optical disk cartridge 14. As shown in FIG. 3A, the magneto-optical disk cartridge 14 has a cartridge case 16. The cartridge case 16 is provided with a slidable shutter 18. A shutter opening arm 20 is mounted at a front end portion of the shutter 18. A write protector 22 for prohibiting writing onto a magneto-optical disk is provided at a rear end portion of the cartridge case 16.

When an end portion 20a of the shutter opening arm 20 is pushed by a slider to be hereinafter described, the shutter 18 is slid on the cartridge case 16. FIG. 3B shows a condition where the shutter 18 is fully open. As shown in FIG. 3B, a magneto-optical disk 24 as a data recording medium is rotatably accommodated in the cartridge case 16. The magneto-optical disk 24 has a central metal hub 26 adapted to be chucked for rotation by a turntable having a magnetic member exerting a magnetic attraction force to be hereinafter described. Two reference holes 28 and 30 for positioning the magneto-optical disk cartridge 14 in the magneto-optical disk drive 10 are formed near the opposite side edges at the rear end portion of the cartridge case 16. The reference hole 28 is a round hole, and the reference hole 30 is an elongated hole.

Figure 4:
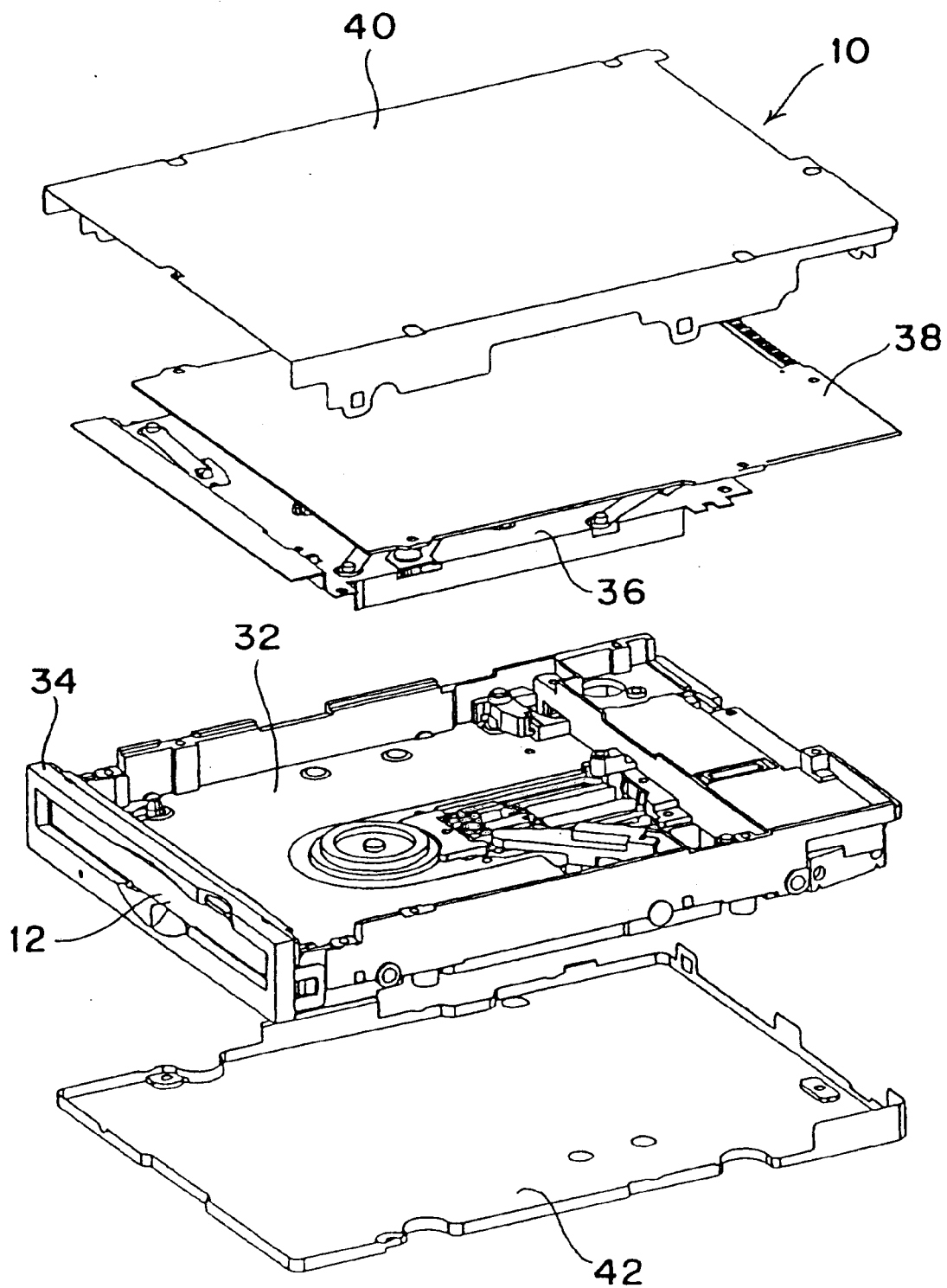
FIG. 4 is an exploded perspective view of the magneto-optical disk drive.

Referring to FIG. 4, there is shown an exploded perspective view of the magneto-optical disk drive 10. Reference numeral 32 denotes a base. A front panel 34 having the insert opening 12 is mounted on the base 32 at its front end. A cartridge holder 36 is mounted on the base 32, and a main printed circuit board 38 is mounted on the cartridge holder 36. Reference numerals 40 and 42 denote an upper cover and a lower cover, respectively.

Figure 5:
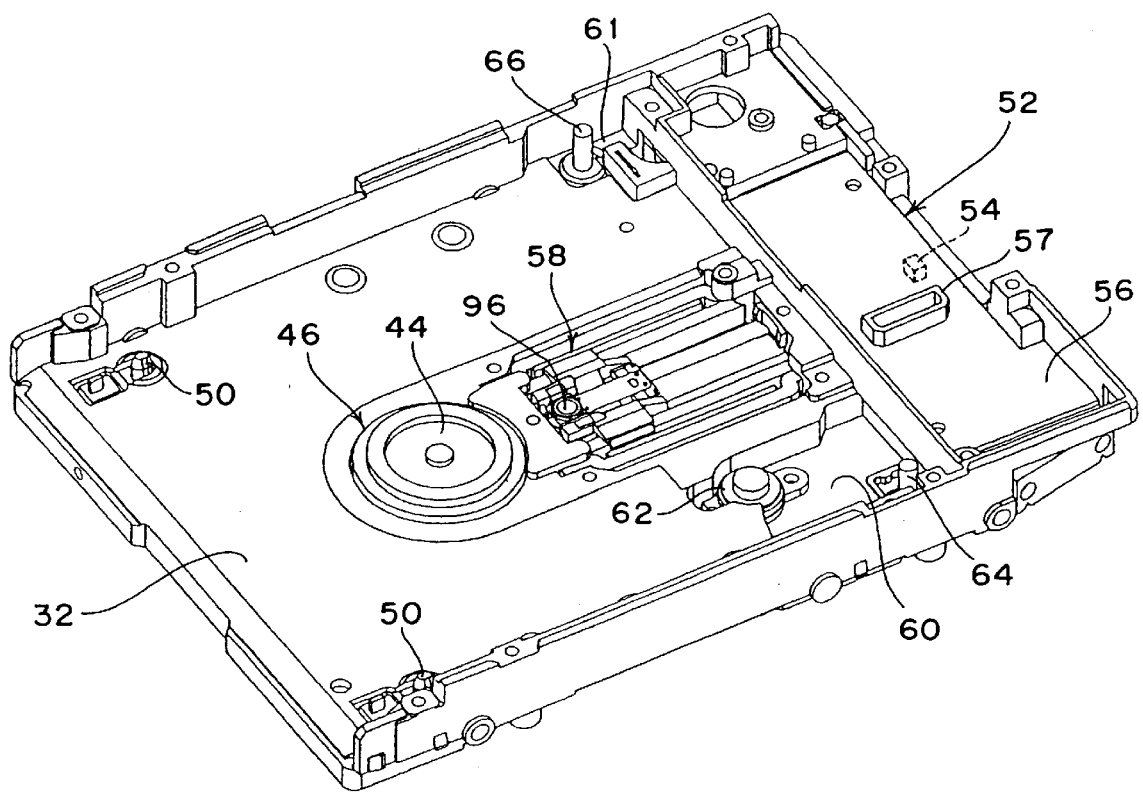
FIG. 5 is a perspective view of a base.
Figure 20:
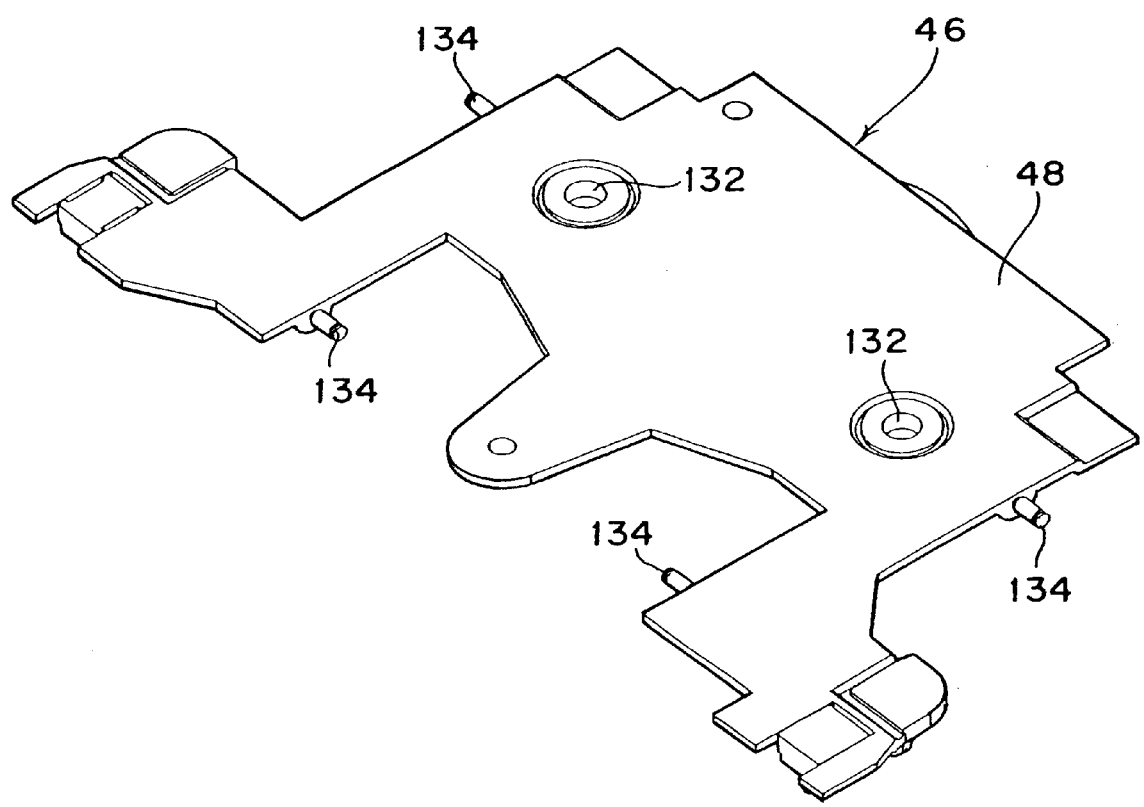
FIG. 20 is a lower perspective view of a turntable assembly.

Referring to FIG. 5, there is shown a perspective view of the base 32. A turntable assembly 46 is vertically movably mounted on the base 32. A spindle motor having a turntable 44 is mounted on the turntable assembly 46. As shown in FIG. 20, the turntable assembly 46 has a metal plate 48 having an upper surface on which the turntable 44 is mounted. A pair of reference pins 50 are provided on the upper surface of the metal plate 48. As shown in FIG. 5, these reference pins 50 project upward from the base 32.

A fixed optical assembly 52 having a laser diode 54 is mounted on the base 32. Although especially not shown, the fixed optical assembly 52 includes a polarization beam splitter, a photodetector for optical signals, and a photodetector for servo signals. Reference numeral 58 denotes a movable optical assembly for moving an objective lens 96 in the radial direction of the magneto-optical disk 24 loaded in the disk drive. The fixed optical assembly 52 and the movable optical assembly 58 constitute an optical pickup. Reference numeral 56 denotes a printed circuit board for the optical pickup. A connector 57 for connection with the main printed circuit board 38 is mounted on the printed circuit board 56.

The base 32 is formed with recesses 60 and 61 by aluminum die casting. A pinion unit 62 sealed with a damper material such as a damping oil is rotatably mounted in the recess 60. Further, a pin 64 is fixed in the recess 60, and a pin 66 is fixed in the recess 61. While the base 32 is formed by aluminum die casting in this preferred embodiment, a support frame formed by pressing a single plate of iron or stainless steel may be adopted as the base 32. Accordingly, the recesses 60 and 61 may be formed by pressing or simply formed like cut holes. With the base 32 and parts arrangement of the preferred embodiment, a 3.5-inch magneto-optical disk drive having a height of about 17 mm can be realized. Thus, the height of the magneto-optical disk drive can be greatly reduced.

Figure 6:
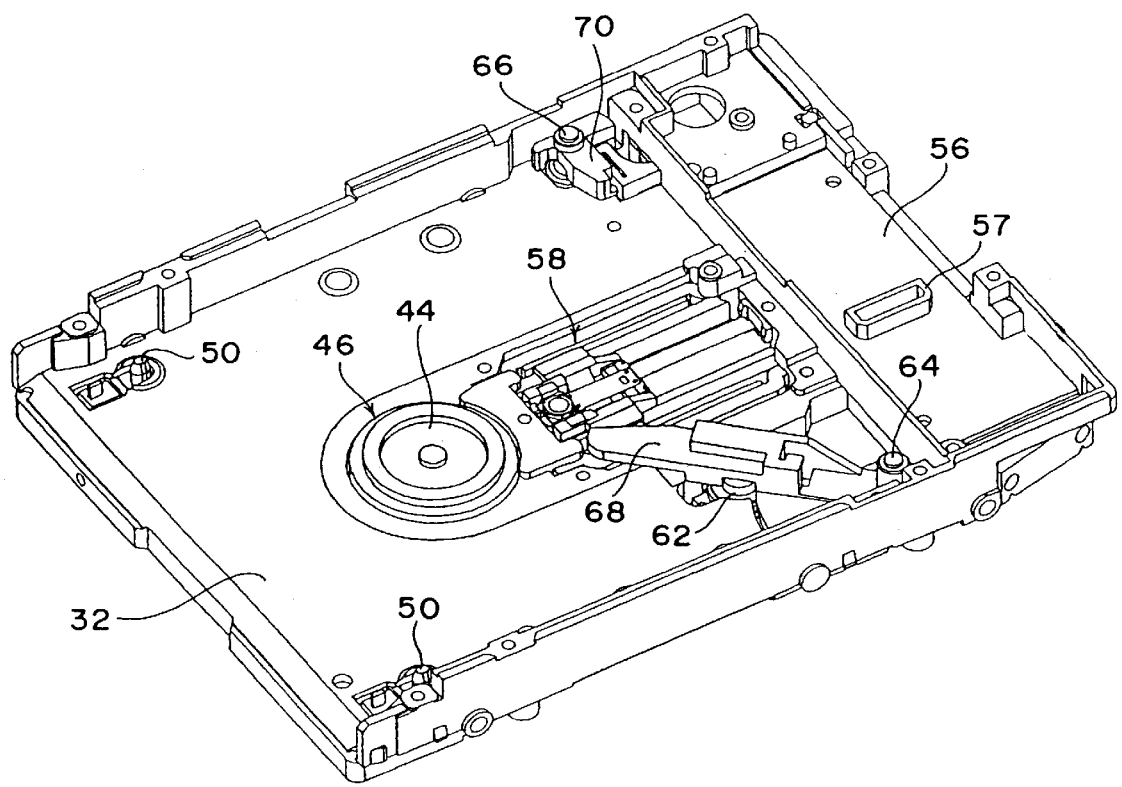
FIG. 6 is a view similar to FIG. 5, showing a condition that an eject arm and a timing arm are mounted on the base.
Figure 7:
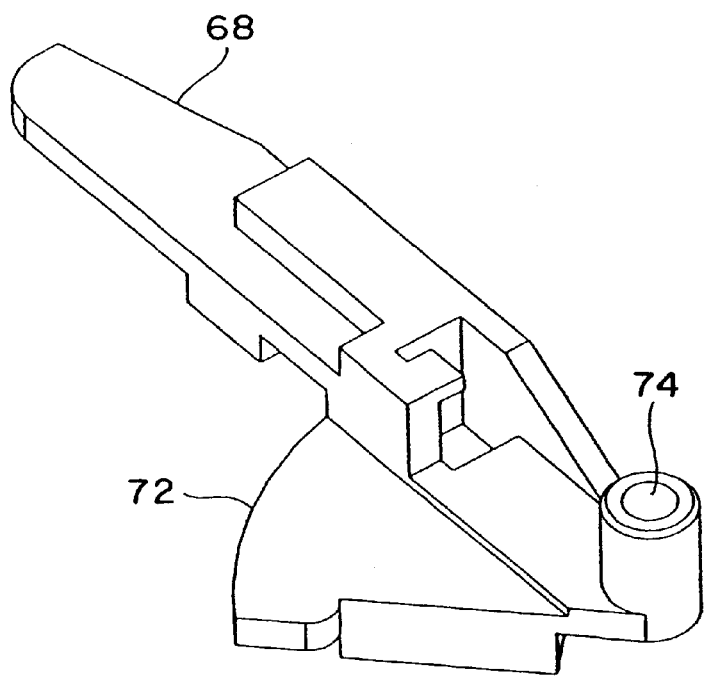
FIG. 7 is a perspective view of the eject arm.

As shown in FIG. 6, an eject arm 68 is pivotably mounted on the pin 64, and a timing arm 70 is pivotably mounted on the pin 66. As shown in FIG. 7, the eject arm 68 is integrally formed with a rack 72 meshing with the pinion unit 62. The eject arm 68 has a hole 74 into which the pin 64 is inserted.

Figure 8:
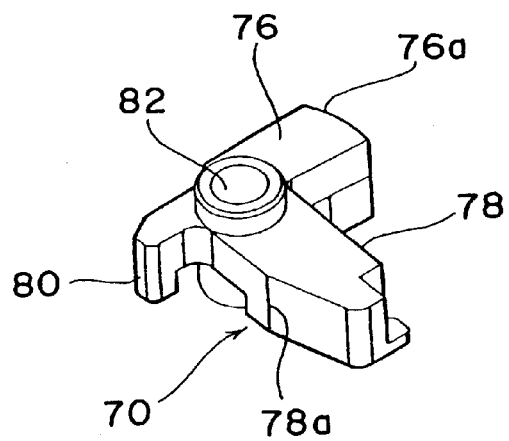
FIG. 8 is a perspective view of the timing arm.

As shown in FIG. 8, the timing arm 70 has a first arm 76, a second arm 78 extending at substantially right angles to the first arm 76, and a projection 80. The timing arm 70 further has a hole 82 into which the pin 66 is inserted. The first arm 76 has a load plate engaging point 76a adapted to engage a load plate to be hereinafter described, and the second arm 78 has a cartridge engaging point 78a adapted to engage the cartridge 14 inserted into the magneto-optical disk drive 10.

Figure 9:
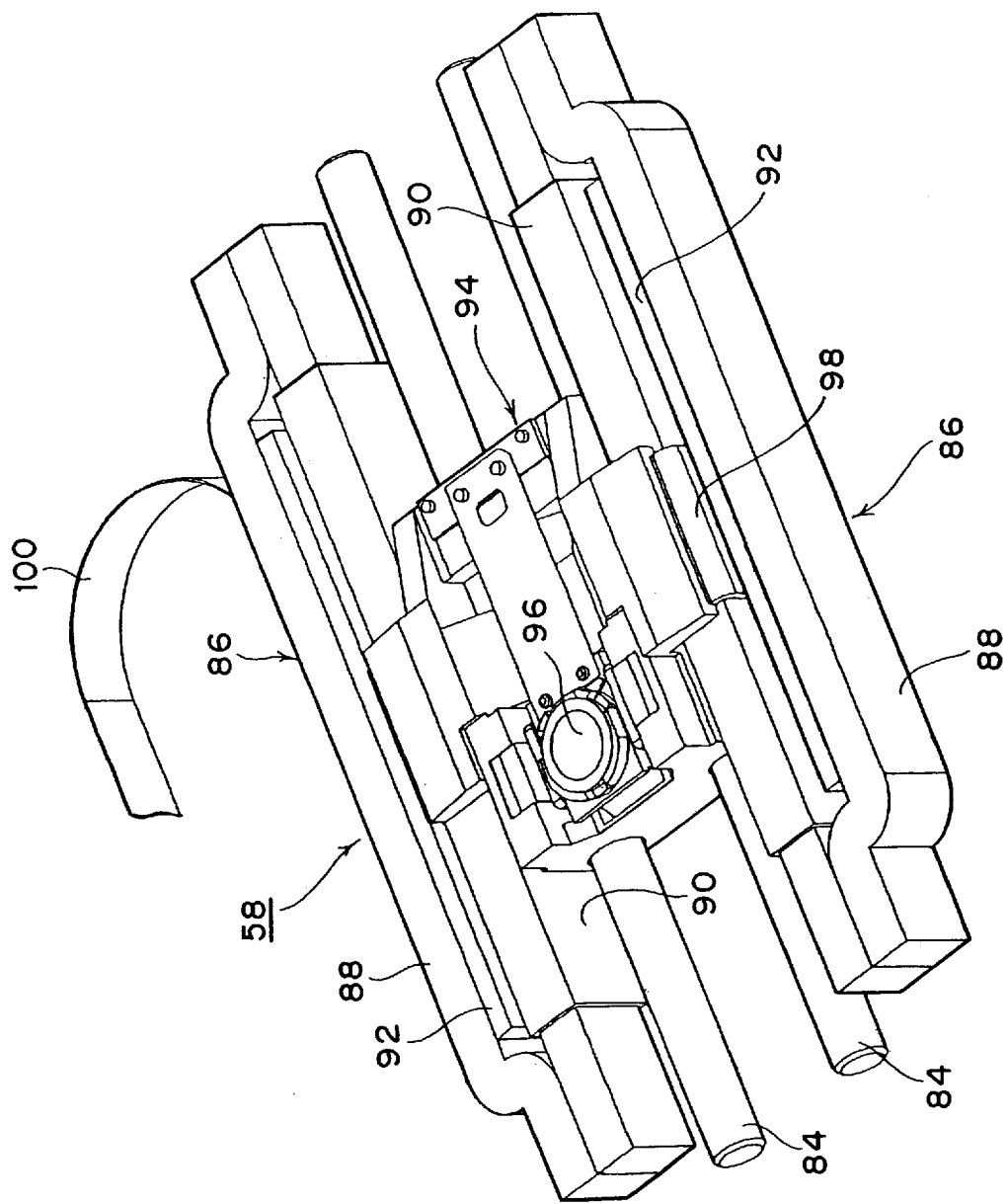
FIG. 9 is a perspective view of a movable optical assembly.

The movable optical assembly 58 will now be described with reference to FIG. 9. The movable optical assembly 58 includes a carriage assembly 94 movable in the radial direction of the magneto-optical disk 24 chucked to the turntable 44 as being guided by a pair of guide rails 84 fixed to the base 32. A pair of magnetic circuits 86 are mounted on the base 32 in parallel to the guide rails 84. Each magnetic circuit 86 includes yokes 88 and 90 mounted on the base 32 and a permanent magnet 92 fixed to the yoke 88 by an adhesive or the like.

The carriage assembly 94 has an objective lens 96 for focusing a laser beam onto a recording surface of the magneto-optical disk 24, and a pair of coils 98 respectively opposed to the pair of magnetic circuits 86. Each coil 98 is inserted in a gap defined between the yoke 90 and the permanent magnet 92 of the corresponding magnetic circuit 86. Each magnetic circuit 86 and the corresponding coil 98 constitute a voice coil motor (VCM). By passing a current through the coils 98, the carriage assembly 94 is moved in the radial direction of the magneto-optical disk 24 as being guided by the guide rails 84.

Thus, the magnetic circuits 86 and the coils 98 constitute a carriage driving mechanism for moving the carriage assembly 94 in the radial direction of the magneto-optical disk 24 to thereby move the objective lens 96 to an arbitrary track on the magneto-optical disk 24 (seek control). Further, the carriage driving mechanism performs tracking control such that the focal point of the objective lens 96 always follows a desired track whose position is fluctuated in the radial direction of the magneto-optical disk 24 by the vibrations of the spindle motor or by off-centering upon chucking the magneto-optical disk 24.

Figure 10:
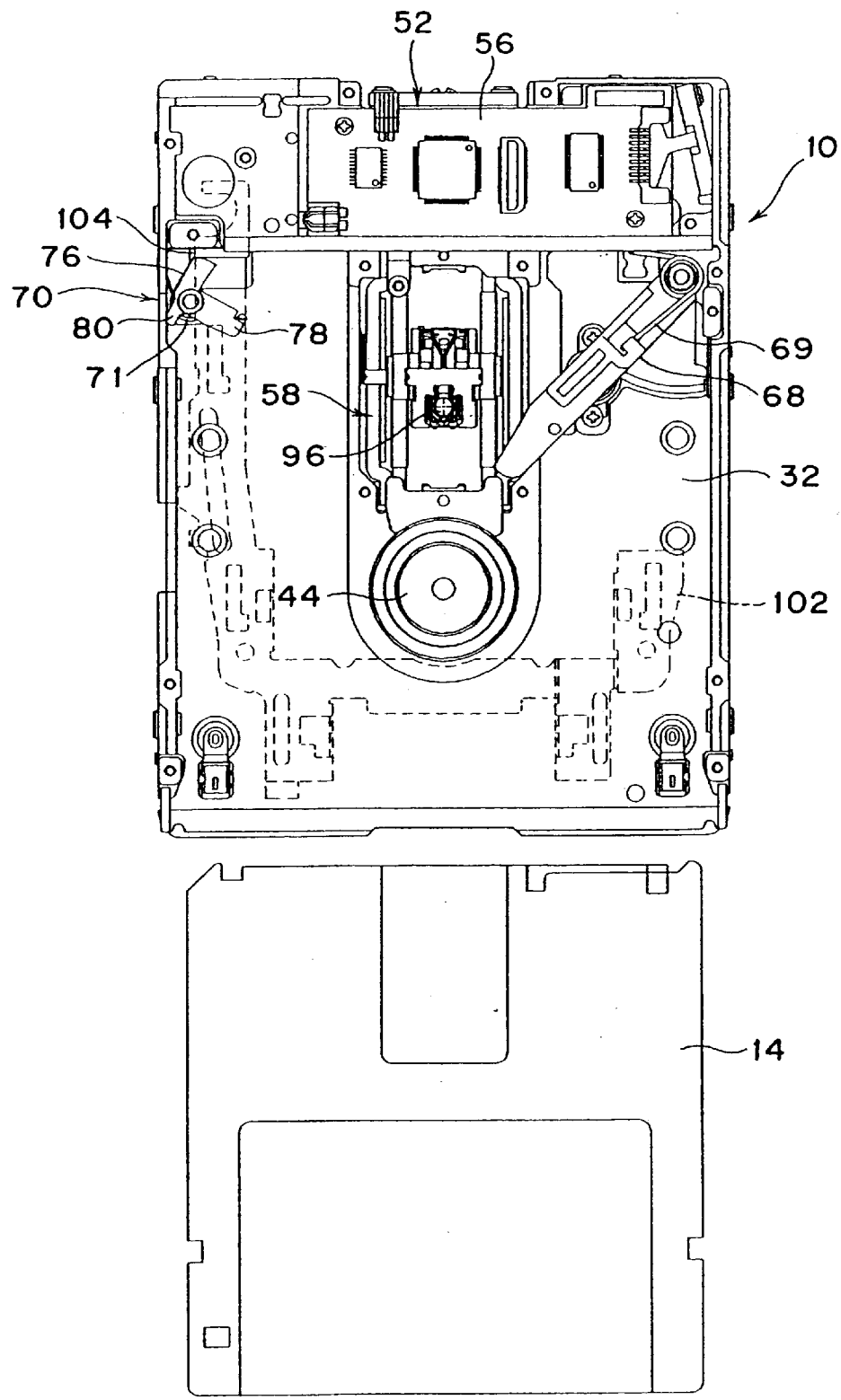
FIG. 10 is a schematic plan view of the magneto-optical disk drive in the condition before inserting the cartridge into the magneto-optical disk drive.
Figure 11:
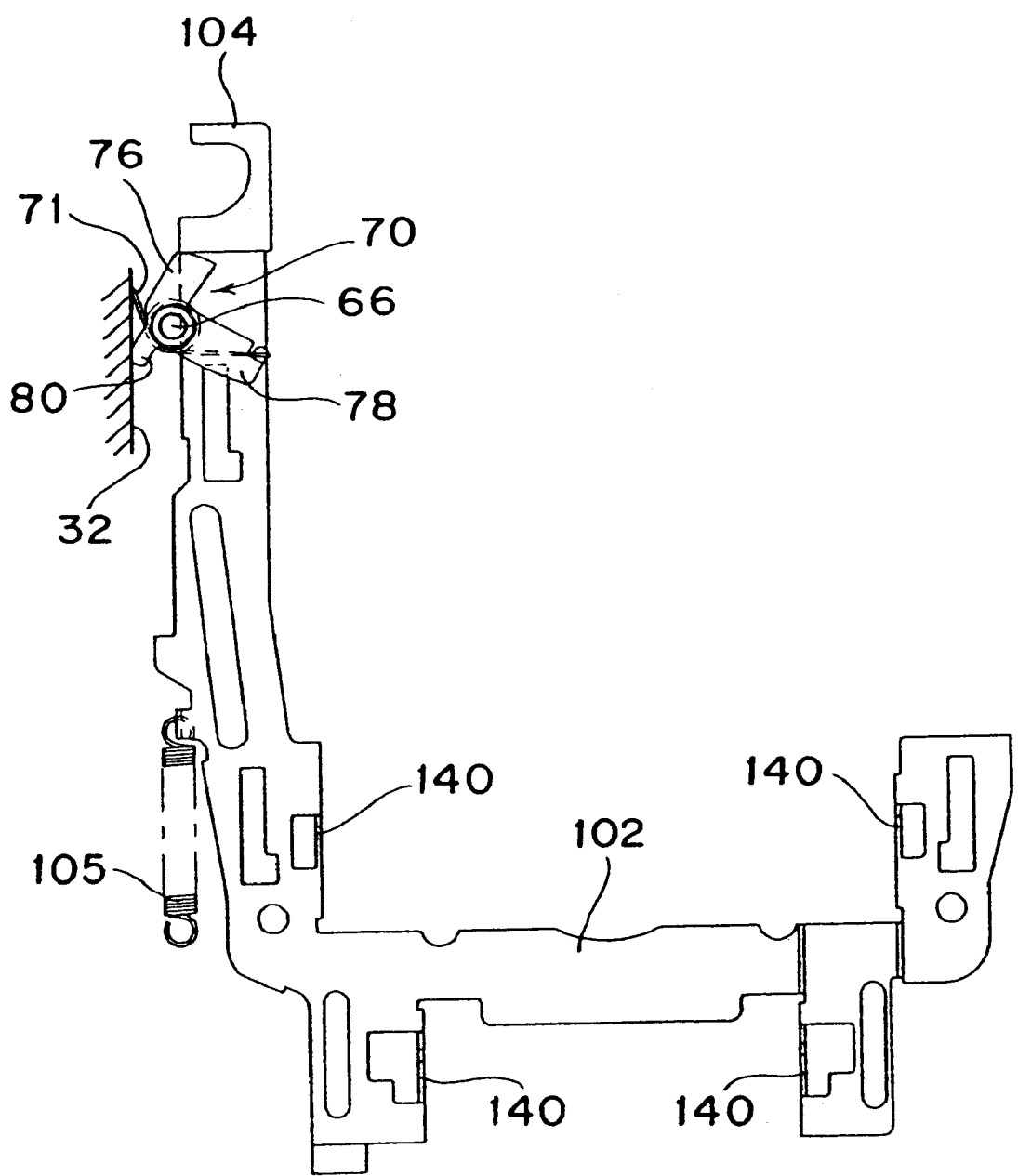
FIG. 11 is a plan view showing the relation between a load plate and the timing arm in the condition shown in FIG. 10.

Referring to FIG. 10, there is shown a schematic plan view of the magneto-optical disk drive 10 in the condition before inserting the cartridge 14 into the magneto-optical disk drive 10. In FIG. 10, the cartridge holder 36 is not shown for simplicity of illustration. FIG. 11 shows the relation between a load plate 102 and the timing arm 70 in the condition shown in FIG. 10. The turntable assembly 46 is mounted on the load plate 102. That is, the load plate 102 has four lift guides 140, and the turntable assembly 46 is mounted on these lift guides 140.

Figure 21:
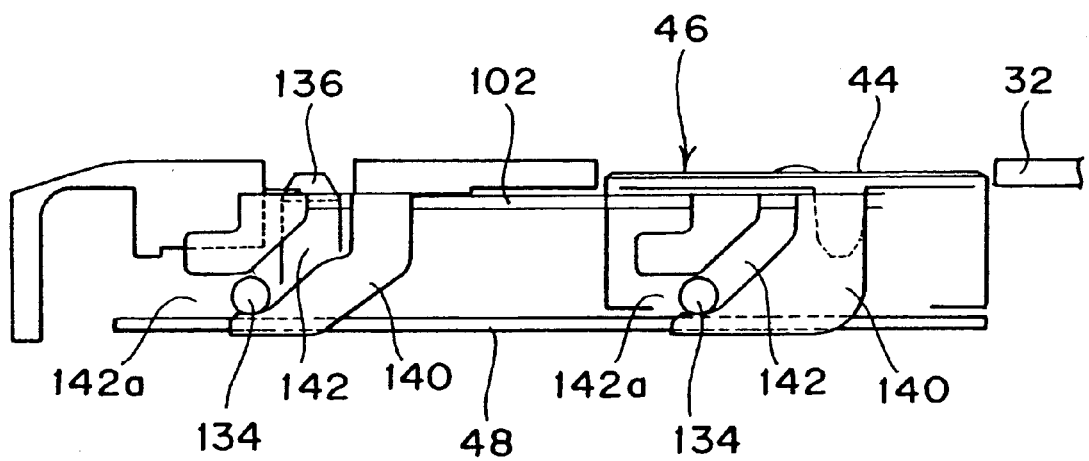
FIG. 21A is a side view showing the positional relation between the turntable assembly and the base in the unloading condition.
FIG. 21B is a view similar to FIG. 21A, in the loading condition.
Figure 21:
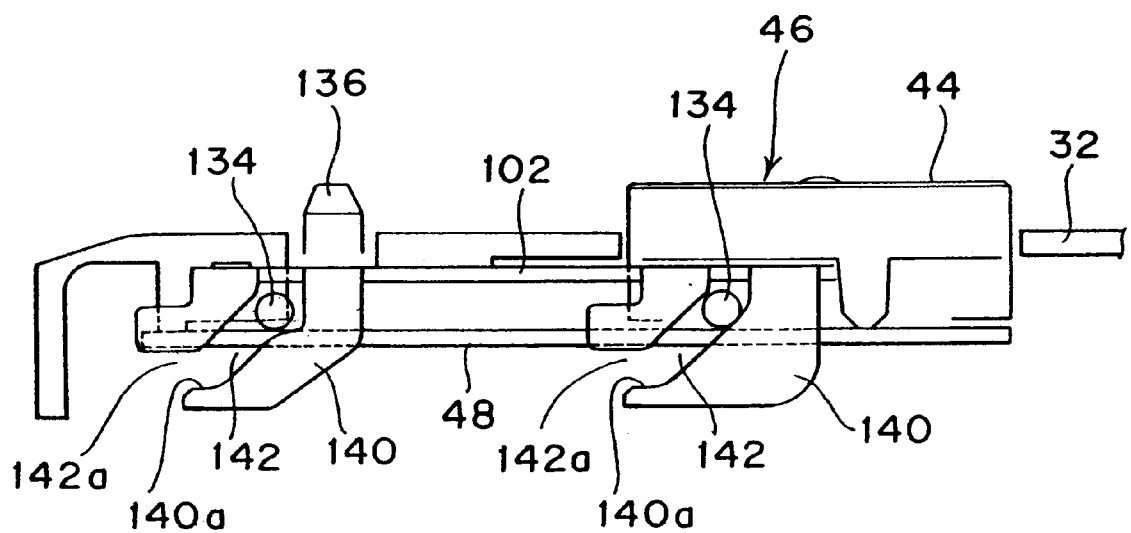

More specifically, as shown in FIG. 21A, each lift guide 140 has an inclined slot 142 having a horizontal portion 142a. As best shown in FIG. 20, the turntable assembly 46 has four horizontal pins 134 respectively inserted through the horizontal portions 142a of the inclined slots 142 of the four lift guides 140 in the unloading condition. That is, each pin 134 is supported by a horizontal end portion 140a of the corresponding lift guide 140 which portion 140a defines the horizontal portion 142a of the inclined slot 142, thereby maintaining the turntable 44 in the unloading position where the turntable 44 is retracted from the upper surface of the base 32.

Referring again to FIG. 11, an engaging member 104 formed of synthetic resin is fixed to a longitudinal end portion of the load plate 102. The load plate 102 is formed of metal such as stainless steel. While the load plate 102 is located below the base 32, the engaging member 104 projects upward from the upper surface of the base 32 through an opening (not shown) formed in the base 32.

The first arm 76 of the timing arm 70 is engaged with the engaging member 104, and the projection 80 of the timing arm 70 is in abutment against a vertical wall 32a of the base 32 perpendicular to a cartridge sliding surface. The timing arm 70 is biased clockwise as viewed in FIG. 11 by a spring 71. On the other hand, the load plate 102 is biased downward (in a cartridge ejecting direction) as viewed in FIG. 11 by a coil spring 105. In the unloading condition shown in FIG. 11, the projection 80 abuts against the wall 32a of the base 32, and the first arm 76 is engaged with the engaging member 104 of the load plate 102, so that the coil spring 105 is expanded and the load plate 102 is maintained at an upward position (first position) as viewed in FIG. 11.

Figure 12:
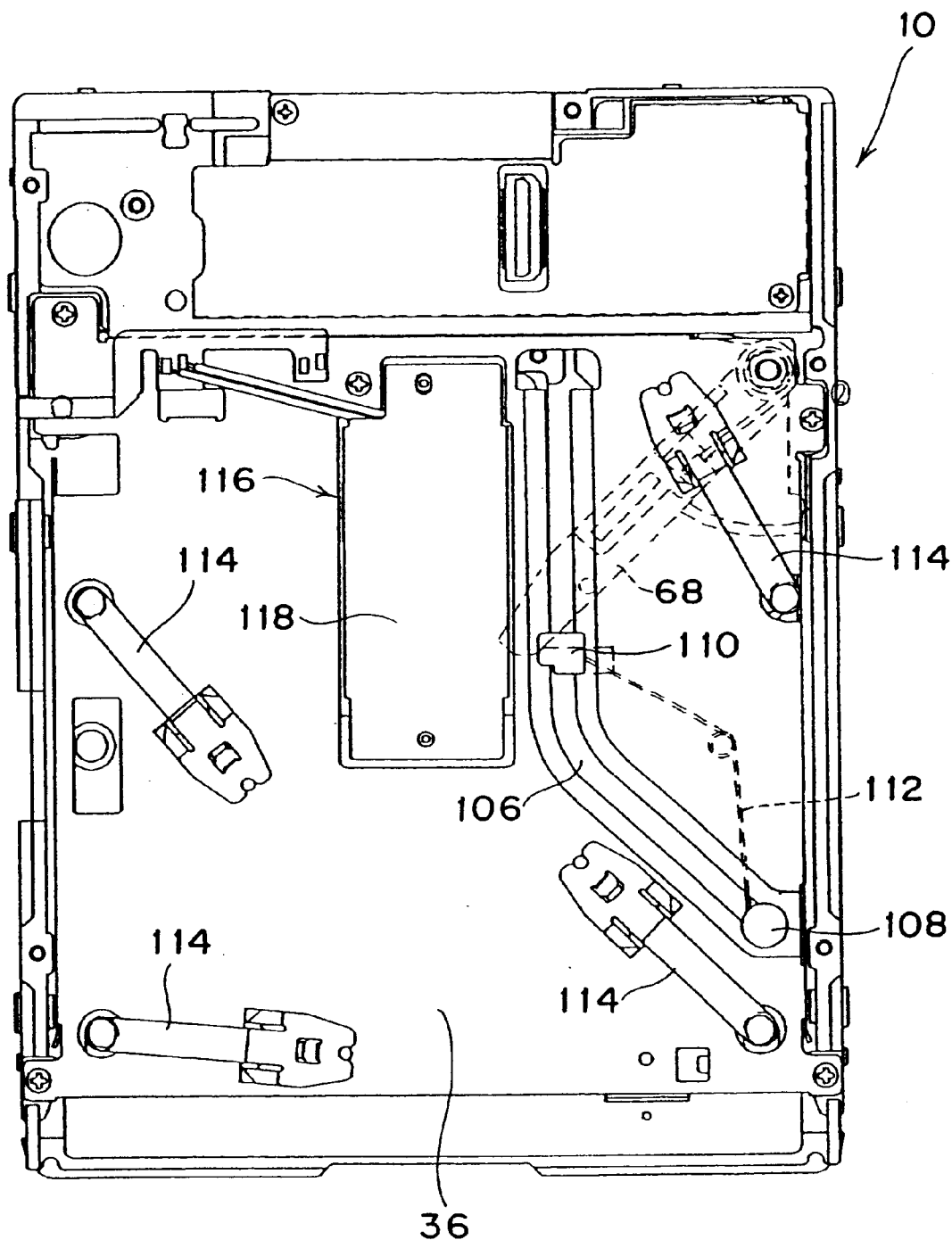
FIG. 12 is a schematic plan view of the magneto-optical disk drive in the condition where a cartridge holder is mounted on the base.
Figure 13:
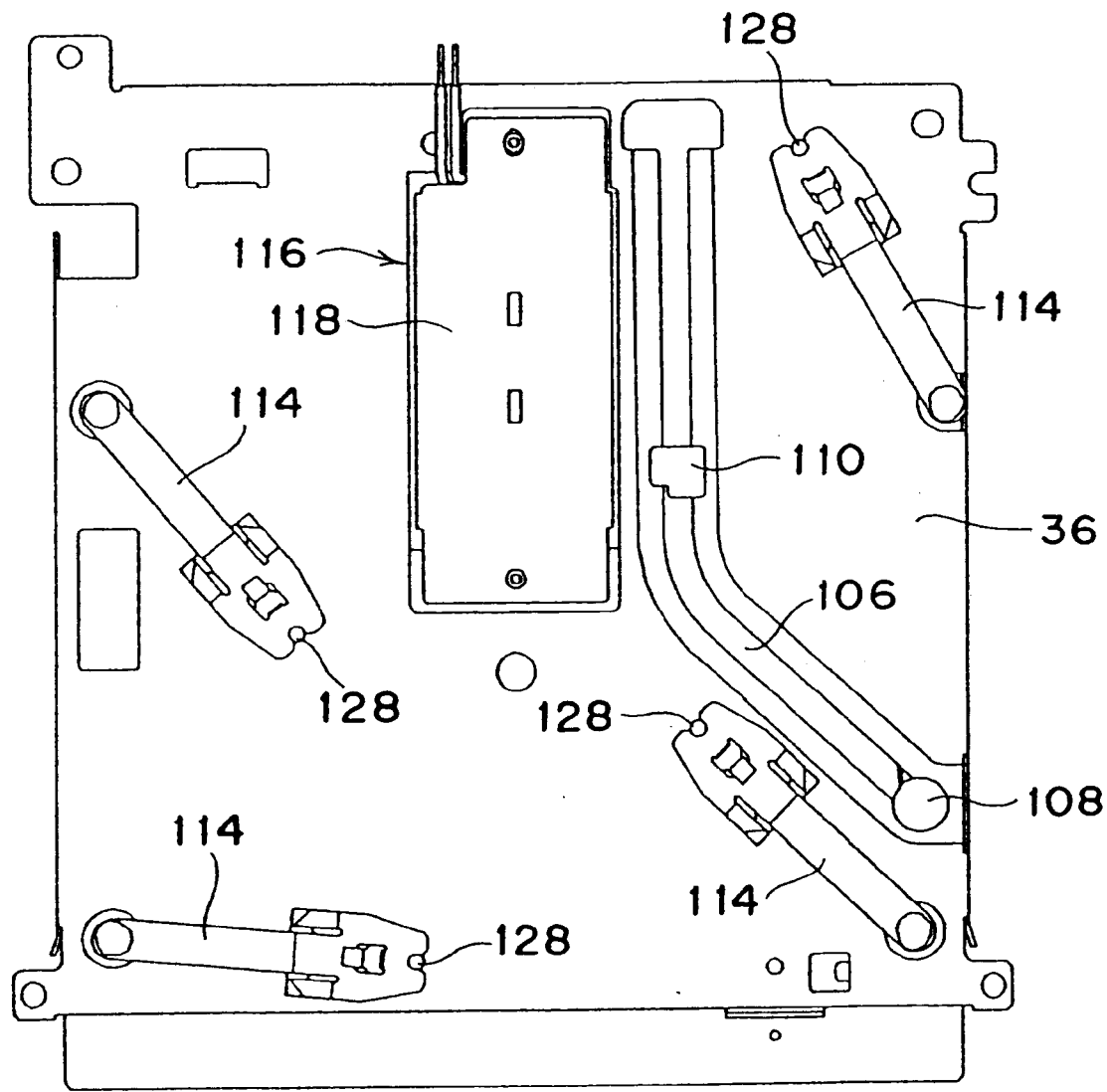
FIG. 13 is a top plan view of the cartridge holder.
Figure 14:
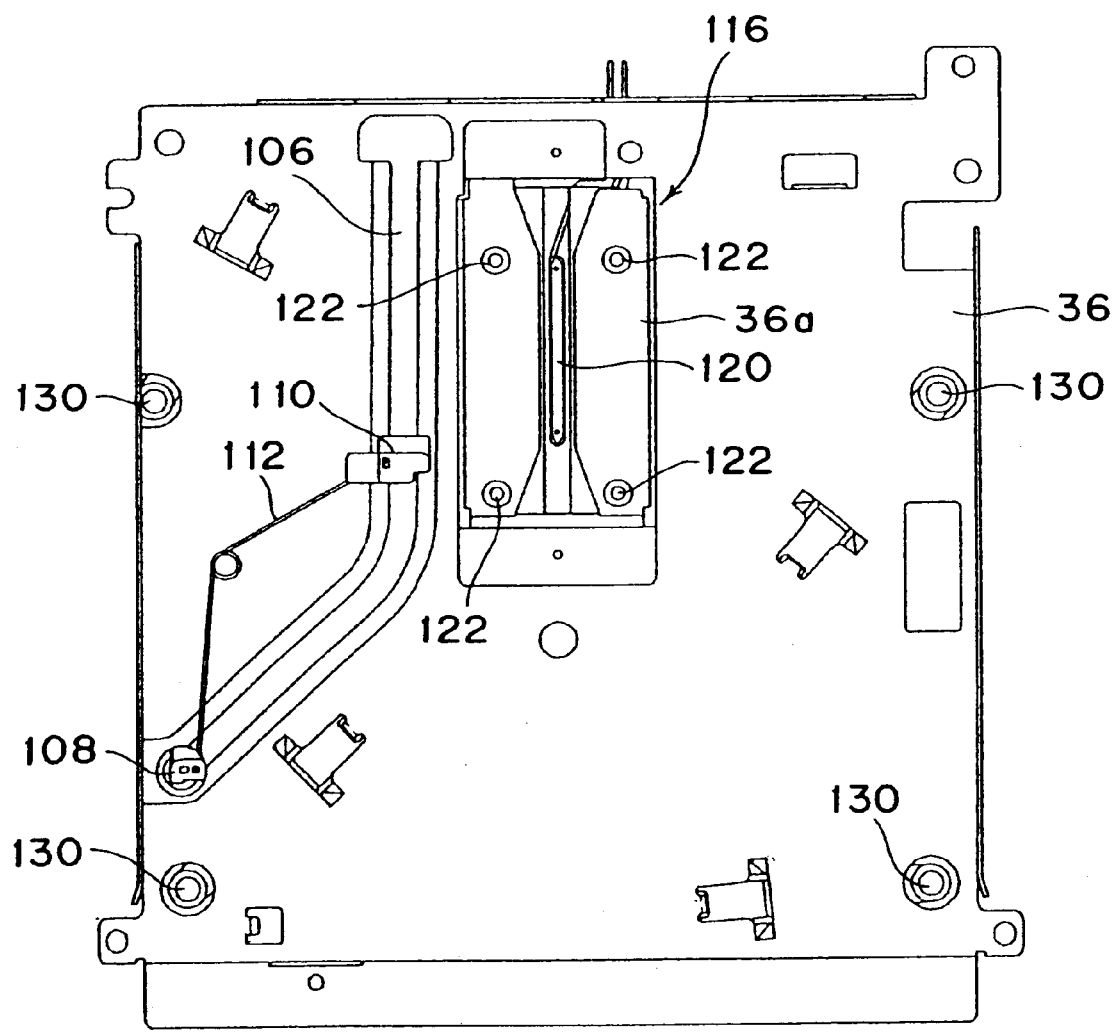
FIG. 14 is a bottom plan view of the cartridge holder.

FIG. 12 is a top plan view of the magneto-optical disk drive 10 in the condition where the cartridge holder 36 is mounted on the base 32. FIG. 13 is a top plan view of the cartridge holder 36, and FIG. 14 is a bottom plan view of the cartridge holder 36. The cartridge holder 36 is formed with a guide groove 106. The guide groove 106 is composed of a first portion obliquely extending from one end of the insert opening 12 laterally inward of the cartridge holder 36 and a second portion extending from an inward end of the first portion to the rear end of the cartridge holder 36 in parallel to the longitudinal direction of the magneto-optical disk drive 10.

A first slider 108 and a second slider 110 are slidably engaged with the guide groove 106. The second slider 110 is connected to the first slider 108 by a spring 112, so that when the first slider 108 is moved rearward, the second slider 110 is moved through the spring 112 to the rear end of the cartridge holder 36. In this preferred embodiment, the eject arm 68 is independent of the second slider 110. Reference numeral 116 denotes a bias magnetic field generating mechanism including a back yoke 118, a permanent magnet (not shown), and a coil (not shown). The bias magnetic field generating mechanism 116 is mounted on the cartridge holder 36 so as to cover a range of movement of the objective lens 96.

The cartridge holder 36 is formed of galvanized sheet steel. As shown in FIG. 14, the bias magnetic field generating mechanism 116 includes a center yoke 120 mounted on the back yoke 118 and a coil (not shown) wound around the center yoke 120. As shown in FIG. 14, four flattened projections 122 are formed on the lower surface of the cartridge holder portion 36a at the bias magnetic field generating mechanism 116, so as to prevent the magneto-optical disk cartridge 14 inserted into the disk drive 10 from colliding with the cartridge holder 36 and/or the center yoke 120.

Figure 15A:
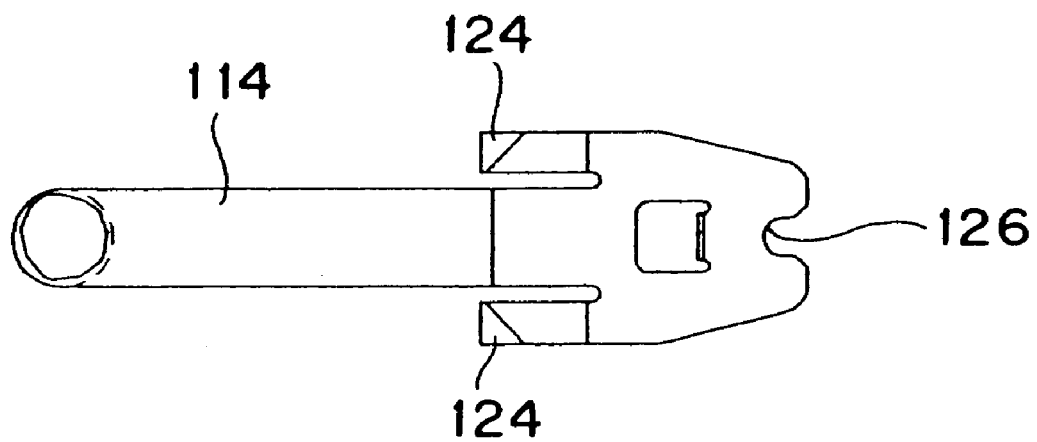
FIG. 15A is a plan view of a cartridge presser spring.
Figure 15B:
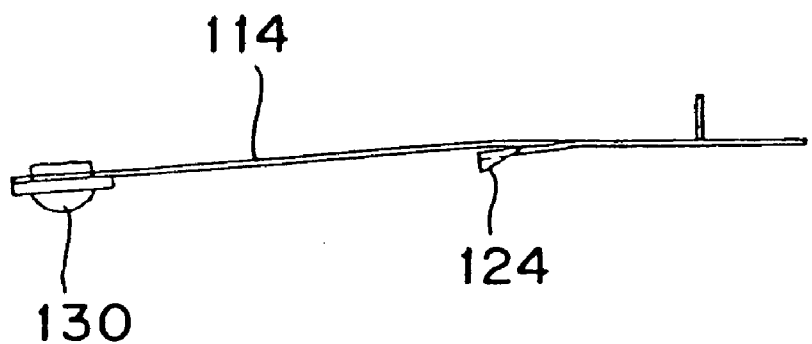
FIG. 15B is an elevational view of the cartridge presser spring.

As shown in FIGS. 12 and 13, four cartridge presser springs 114 are mounted on the cartridge holder 36. As shown in FIGS. 15A and 15B, each cartridge presser spring 114 has two mounting lugs 124 and a semicircular recess 126. Further, a pad 130 formed of synthetic resin is mounted at a front end portion of each cartridge presser spring 114. The mounting lugs 124 of each cartridge presser spring 114 are inserted through slits formed in the cartridge holder 36, and the semicircular recess 126 of each cartridge presser spring 114 is engaged with a pin 128 fixed to the cartridge holder 36, thereby mounting each cartridge presser spring 114 on the cartridge holder 36. As shown in FIG. 14, the synthetic resin pad 130 of each cartridge presser spring 114 projects from the lower surface of the cartridge holder 36 through an opening formed in the cartridge holder 36.

Figure 16:
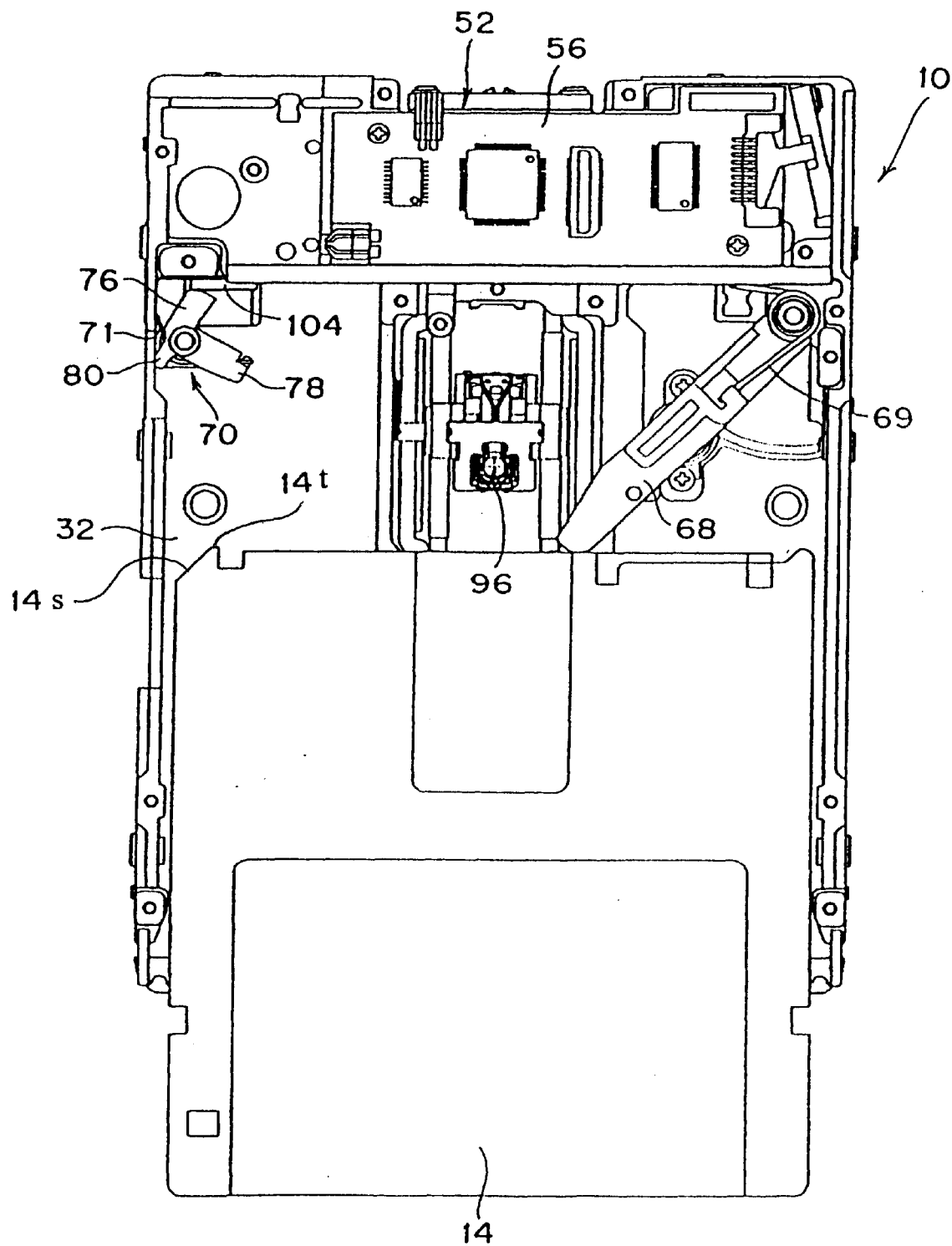
FIG. 16 is a schematic plan view of the magneto-optical disk drive in the middle of insertion of the cartridge into the magneto-optical disk drive.

Referring to FIG. 16, there is shown a schematic plan view of the magneto-optical disk drive 10 in the middle of insertion of the cartridge 14 into the magneto-optical disk drive 10. In the condition shown in FIG. 16, the cartridge 14 is not in contact with the timing arm 70. Therefore, the timing arm 70 is maintained in the condition shown in FIGS. 10 and 11, and the load plate 102 is maintained in the first position. Accordingly, the turntable assembly 46 is maintained in its lowered position. In this condition, the first arm 76 of the timing arm 70 is engaged at the load plate engaging point 76a with the engaging member 104.

Figure 17:
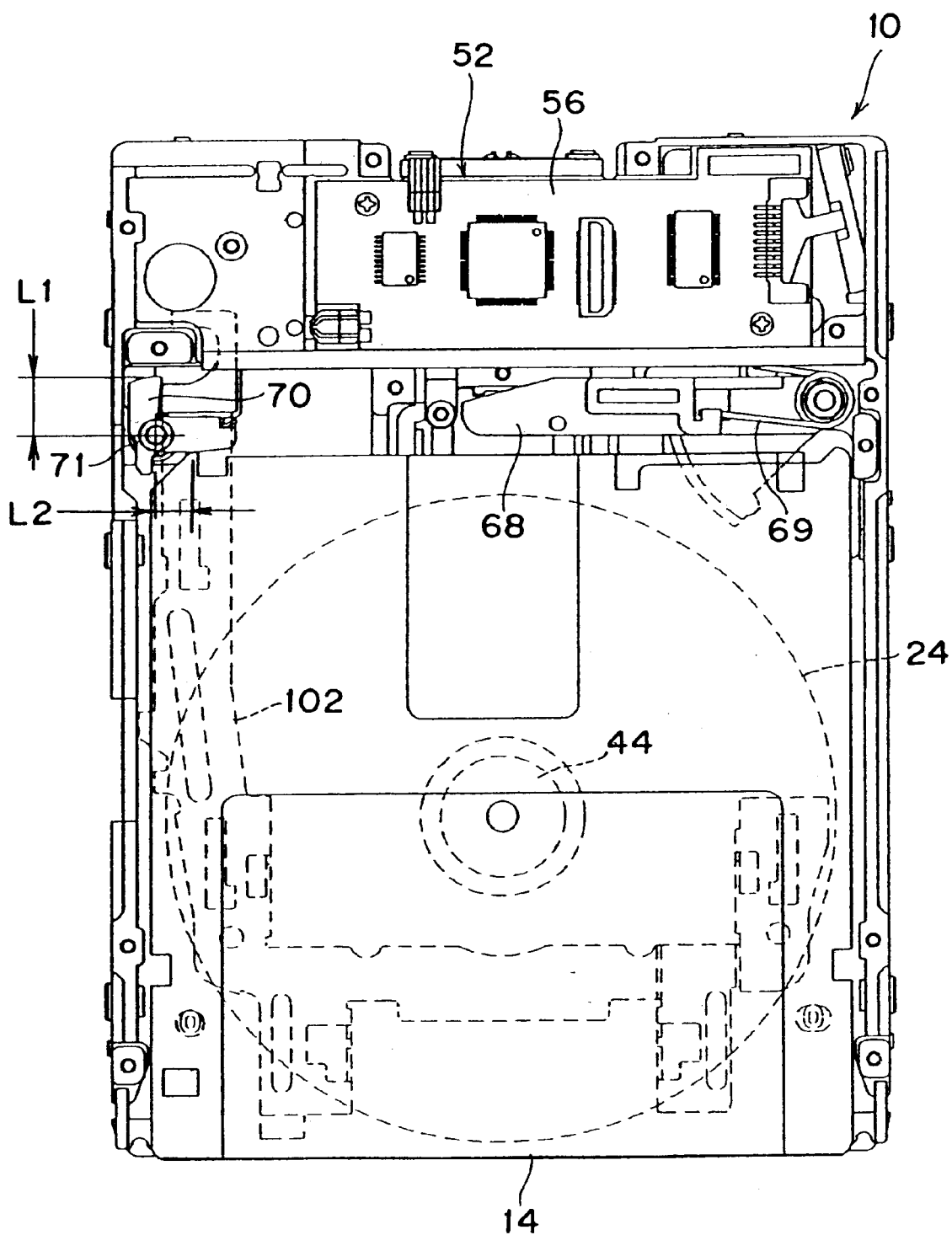
FIG. 17 is a schematic plan view of the magneto-optical disk drive in the condition where a magneto-optical disk in the cartridge has been chucked.
Figure 18:
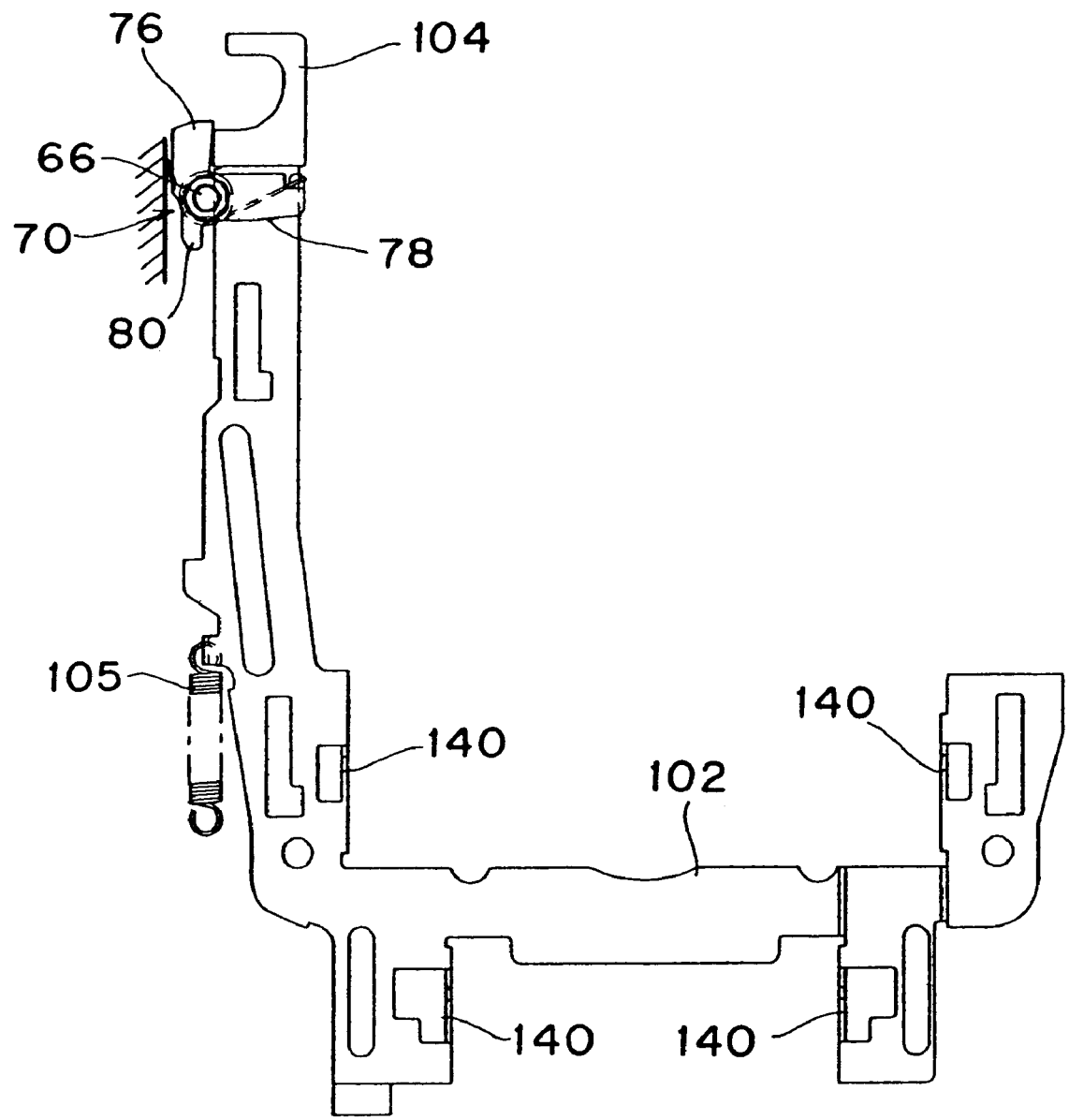
FIG. 18 is a plan view showing the relation between the load plate and the timing arm in the condition shown in FIG. 17.

Referring to FIG. 17, there is shown a schematic plan view of the magneto-optical disk drive 10 in the condition where the magneto-optical disk 24 in the cartridge 14 has been chucked or loaded. FIG. 18 shows the relation between the load plate 102 and the timing arm 70 in the condition shown in FIG. 17. When the cartridge 14 is further inserted from the condition shown in FIG. 16, a slant surface 14s of the cartridge 14 comes into contact with the second arm 78 of the timing arm 70 to push the timing arm 70 and rotate it counterclockwise as viewed in FIG. 16.

Thereafter, a front end 14t of the slant surface 14s of the cartridge 14 abuts against the second arm 78 of the timing arm 70 at the cartridge engaging point 78a shown in FIG. 8, so that the insertion of the cartridge 14 is stopped. When the timing arm 70 is pushed by the cartridge 14 and thereby pivotally moved to a given position as mentioned above, the first arm 76 of the timing arm 70 is disengaged from the engaging member 104, and the load plate 102 is almost instantaneously moved to a downward position (second position) as viewed in FIG. 17 by the biasing force of the spring 105. When the load plate 102 is moved to the second position as mentioned above, the pins 134 of the turntable assembly 46 are moved along the inclined slots 142 of the lift guides 140 of the load plate 102 as shown in FIG. 21B, so that the turntable 44 projects from the upper surface of the base 32 to obtain a loading position. In this loading position, a magnet provided in the turntable 44 of the spindle motor magnetically chucks the metal hub 26 of the magneto-optical disk 24.

Figure 19:
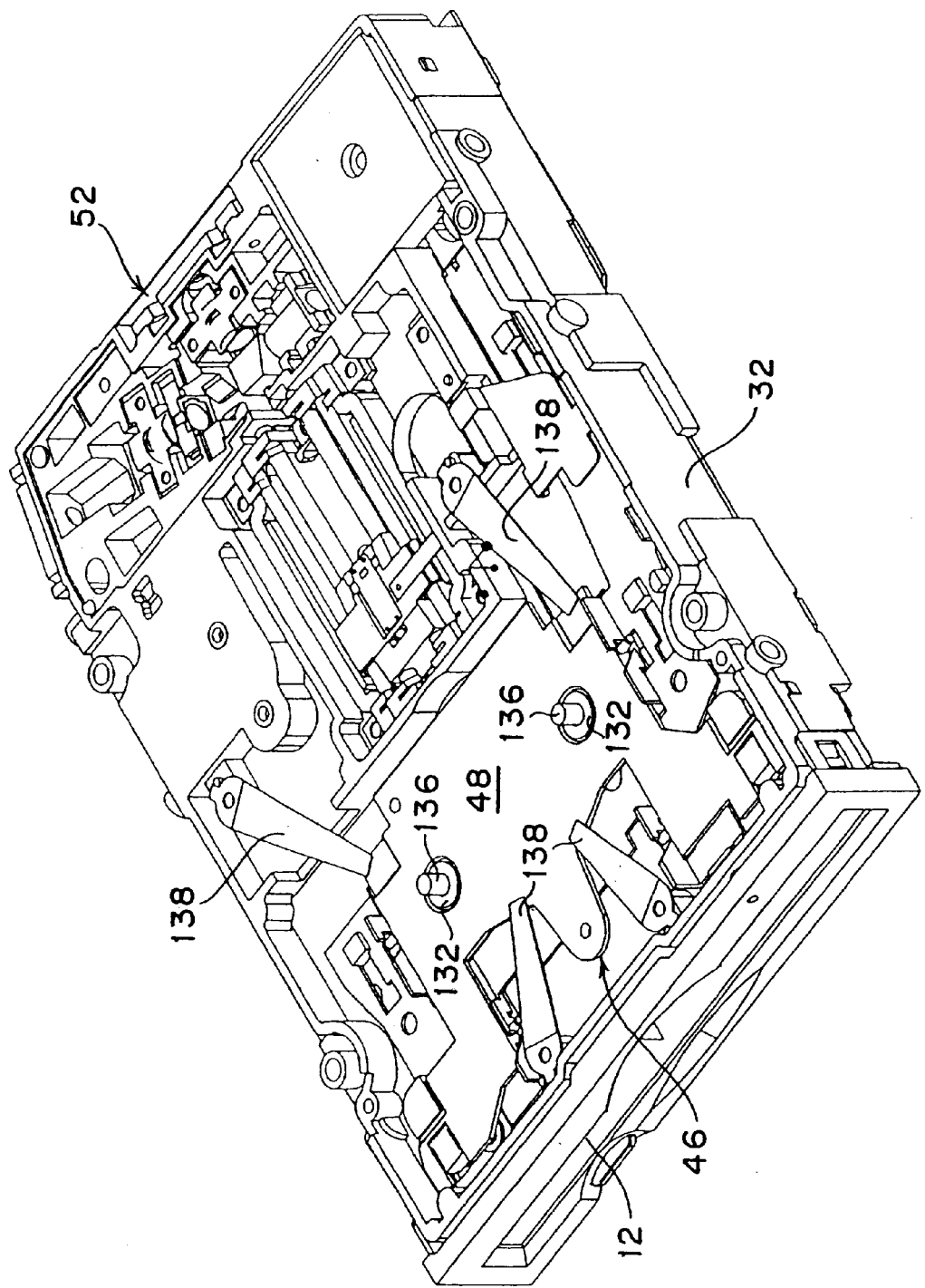
FIG. 19 is a lower perspective view of the base.

Referring to FIG. 19, there is shown a lower perspective view of the base 32. The metal plate 48 of the turntable assembly 46 is formed with a pair of holes 132. A pair of pins 136 fixed to the base 32 are inserted through the pair of holes 132. Accordingly, the turntable assembly 46 can be vertically moved relative to the base 32 as being guided by the pins 136 in concert with the sliding motion of the pins 134 of the turntable assembly 46 along the inclined slots 142 of the lift guides 140 of the load plate 102. Reference numerals 138 denote leaf springs for pushing up the turntable assembly 46.

Referring again to FIG. 17, the distance L1 between the pivotal center of the timing arm 70 and the load plate engaging point 76a of the first arm 76 (see FIG. 8) and the distance L2 between the pivotal center of the timing arm 70 and the cartridge engaging point 78a of the second arm 78 (see FIG. 8) are related to satisfy $L1 \geq L2$. The stop position of the cartridge 14 fully inserted into the disk drive may be longitudinally shifted from a prescribed position because of the mounting accuracy errors or parts tolerances of the base 32, the turntable assembly 46, the timing arm 70, the load plate 102, etc. It is sufficient that a displacement of the first arm 76 due to such mounting accuracy errors or parts tolerances is to be smaller than that of the second arm 78, so that the relation of $L1 \geq L2$ is prescribed above.

Figure 22:
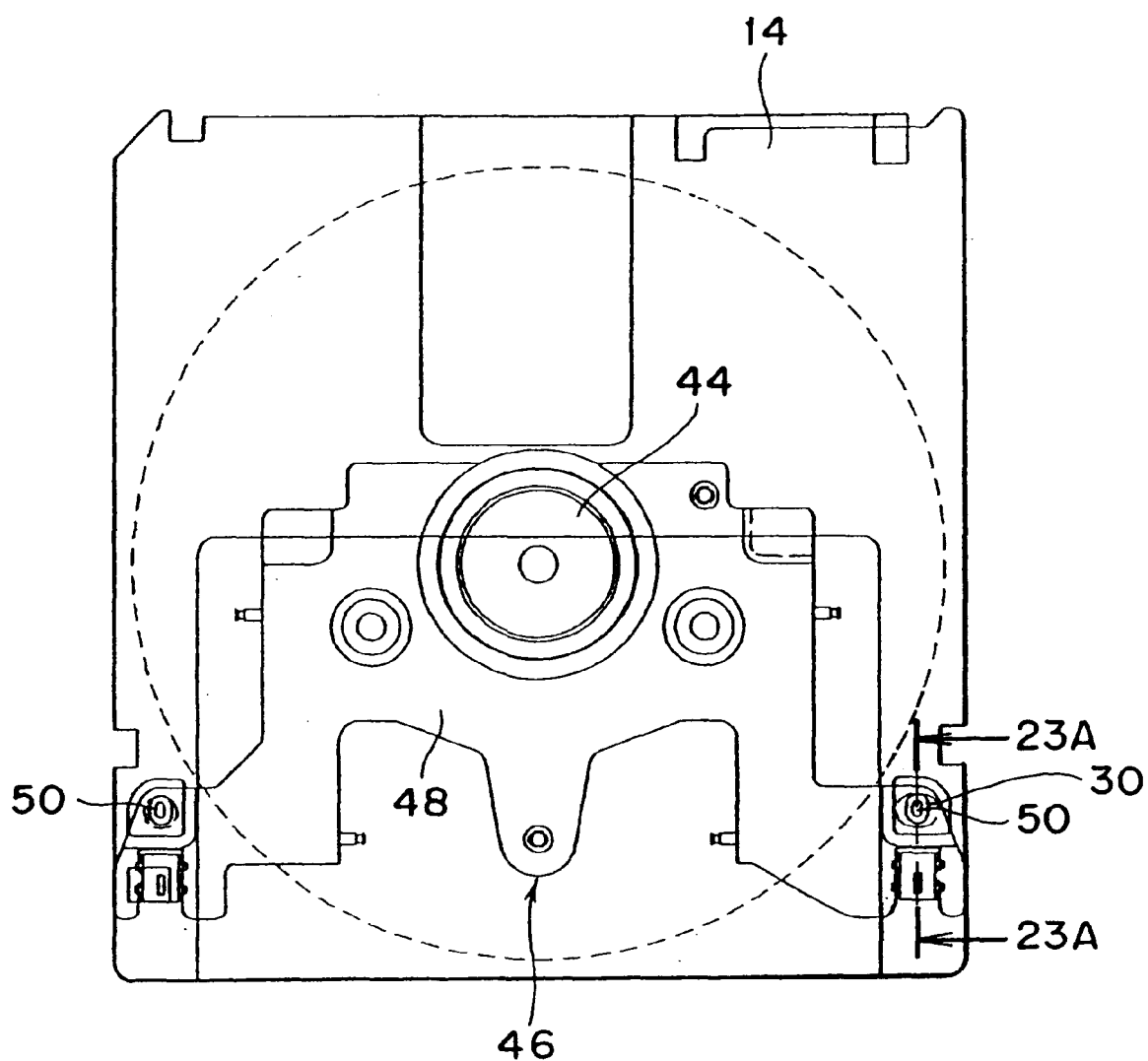
FIG. 22 is a plan view showing the relation between the turntable assembly and the cartridge in chucking the magneto-optical disk.

According to this preferred embodiment, the length L2 is set shorter than or equal to the length L1, thereby preventing an increase in deviation of chucking timing due to the dimensional tolerances of the components. As a result, when the cartridge 14 is inserted to a given position, the timing arm 70 is disengaged from the load plate 102. Accordingly, the reference pins 50 of the turntable assembly 46 can be reliably engaged into the reference holes 28 and 30 of the cartridge 14 as shown in FIG. 22.

Figure 23:
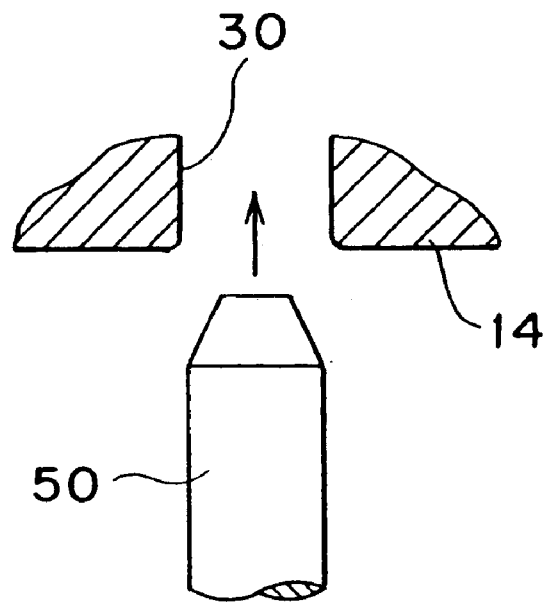
FIG. 23A is a cross section taken along the line 23A—23A in FIG. 22, showing the condition where a reference pin is aligned with a reference hole.
FIG. 23B is a view similar to FIG. 23A, showing the condition where the reference pin is engaged with the reference hole.
Figure 23:
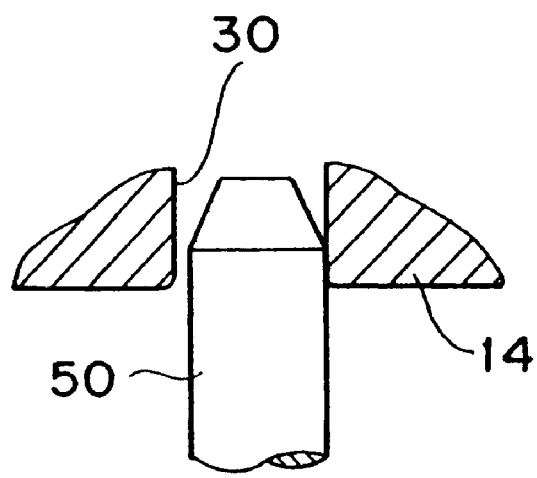

FIG. 23A shows a condition that one of the reference pins 50 of the turntable assembly 46 is aligned with the reference hole 30 of the cartridge 14 at the time the load plate 102 is disengaged from the timing arm 70. When the load plate 102 is moved from this condition to the second position by the biasing force of the spring 105, the turntable assembly 46 is lifted, so that the reference pin 50 is inserted into the reference hole 30 as shown in FIG. 23B. In this condition, the metal hub 26 of the magneto-optical disk 24 is chucked by the magnet of the turntable 44 of the spindle motor.

According to this preferred embodiment, the timing arm 70 independent of the eject arm 68 is used, and the timing arm 70 is configured so that the relation of L1≧L2 is satisfied. Accordingly, an increase in deviation of chucking timing due to the dimensional tolerances of the components can be prevented to obtain reliable chucking timing of the magneto-optical disk.

While the magneto-optical disk cartridge 14 in which the magneto-optical disk 24 is accommodated is used as a storage medium in the above preferred embodiment, the present invention is applicable also to a tray etc. for removably carrying a storage medium. Further, the present invention is applicable also to a cartridge loading type storage device using a movable cartridge holder. Further, the present invention is applicable also to a read-only type optical storage medium, a phase-change type optical storage medium such as CD and DVD, and a magnetic storage medium such as a floppy disk.

According to the present invention as described above, when the carrier is inserted to a given position, the load plate can be disengaged from the timing arm, so that the positioning accuracy of the turntable in chucking the optical disk can be ensured to thereby prevent defective chucking of the optical disk. Accordingly, it is possible to provide a reliable optical storage device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A storage device comprising:
a turntable adapted to engage a storage medium for rotatably supporting said storage medium;
a load plate adapted to move from a first position to a second position in concert with insertion of a carrier carrying said storage medium into said storage device for chucking said storage medium to said turntable; and
a timing arm having a first arm for engaging said load plate to maintain said load plate in said first position, a second arm adapted to engage said carrier inserted into said storage device, and an operational center for cooperating said first arm and said second arm;
wherein the distance between said operational center and a position of engagement of said first arm and said load plate is set greater than or equal to the distance between said operational center and a position of engagement of said second arm and said carrier.

2. A storage device according to claim 1, further comprising a support member for supporting said timing arm;
wherein said first arm is supported to said support member so as to be pivotally movable between a third position for maintaining said load plate in said first position and a fourth position for disengaging said load plate in concert with the insertion of said carrier to allow movement of said load plate to said second position.

3. A storage device according to claim 2, wherein said second arm is supported to said support member so as to be pivotally movable between a fifth position corresponding to said third position of said first arm and a sixth position corresponding to said fourth position of said first arm.

4. A storage device according to claim 3, further comprising a biasing member for biasing said timing arm so that said first arm is maintained in said third position and that said second arm is maintained in said fifth position.

5. A storage device according to claim 4, further comprising:
a holder for holding said carrier inserted in said storage device;
an eject arm adapted to engage said carrier; and
a second biasing member for biasing said eject arm in a direction of ejecting said carrier from said storage device;
wherein when said storage medium is unchucked from said turntable, said eject arm ejects said carrier from said storage device.

6. A storage device according to claim 5, further comprising:
a base; and
a pinion unit rotatably mounted on said base and sealed with a damper material;
said eject arm having a rack meshing with said pinion unit.

7. A storage device according to claim 6, wherein said base has a recess, and said pinion unit is mounted in said recess of said base.

8. A storage device according to claim 5, wherein said holder has a presser member for pressing said carrier onto said turntable.

9. A storage device according to claim 1, wherein said first arm and said second arm are integrally formed so that said first arm extends from said operational center in a first direction and said second arm extends from said operational center in a second direction forming a given angle with respect to said first direction.

10. A storage device according to claim 1, wherein said carrier is selected from any one of a cartridge in which said storage medium is accommodated and a tray for placing said storage medium thereon.

11. A storage device according to claim 1, wherein said storage medium is selected from any one of a read-only type optical disk, a phase-change type optical disk, a magneto-optical disk, and a magnetic disk.

12. A storage device according to claim 1, further comprising a turntable assembly on which said turntable is mounted, said turntable assembly being movable between a raised position where said storage medium is chucked to said turntable and a lowered position where said storage medium is unchucked from said turntable.

13. A storage device according to claim 12, wherein said carrier has a reference hole, and said turntable assembly has a reference pin adapted to be inserted into said reference hole of said carrier in said raised position.

14. A storage device according to claim 12, wherein said turntable assembly has a guide pin, and said load plate has a lift guide engaging with said guide pin, said guide pin being moved on said lift guide by the movement of said load plate from said first position to said second position.

* * * * *